US006456854B1

(12) United States Patent
Chern et al.

(10) Patent No.: US 6,456,854 B1
(45) Date of Patent: Sep. 24, 2002

(54) SYSTEM AND METHOD FOR LOCATING AND TRACKING MOBILE TELEPHONE DEVICES VIA THE INTERNET

(75) Inventors: Vincent Chern; Jong Tae Chung; Dung John Dinh, all of San Diego, CA (US)

(73) Assignee: Leap Wireless International, San Diego, CA (US)

( * ) Notice: Subject to any disclaimer, the term of this patent is extended or adjusted under 35 U.S.C. 154(b) by 0 days.

(21) Appl. No.: 09/566,596

(22) Filed: May 8, 2000

(51) Int. Cl.[7] ................................................. H04B 7/20

(52) U.S. Cl. ........................ 455/457; 455/456; 455/414; 455/426; 455/458

(58) Field of Search ................................ 455/457, 458, 455/466, 461, 456, 414, 426; 701/201, 203, 217–219; 370/352; 340/825.36

(56) References Cited

U.S. PATENT DOCUMENTS

| | | |
|---|---|---|
| 5,479,482 A | 12/1995 | Grimes |
| 5,625,668 A | 4/1997 | Loomis et al. |
| 5,712,899 A | 1/1998 | Pace, II |
| 5,786,789 A | 7/1998 | Janky |
| 5,796,365 A | 8/1998 | Lewis |
| 5,797,091 A | 8/1998 | Clise et al. |
| 5,848,396 A | 12/1998 | Gerace |
| 5,852,775 A | 12/1998 | Hidary |
| 5,872,539 A | 2/1999 | Mullen |
| 5,913,170 A | 6/1999 | Wortham |
| 5,917,405 A * | 6/1999 | Joao ............................ 340/426 |
| 5,938,721 A | 8/1999 | Dussell et al. |
| 5,959,577 A | 9/1999 | Fan et al. |
| 5,991,735 A | 11/1999 | Gerace |
| 6,026,309 A | 2/2000 | Moon et al. |
| 6,050,898 A | 4/2000 | Vange et al. |
| 6,055,510 A | 4/2000 | Henrick et al. |
| 6,075,783 A * | 6/2000 | Voit ........................... 370/352 |
| 6,076,099 A * | 6/2000 | Chen et al. .................. 709/202 |
| 6,091,956 A | 8/2000 | Hollenberg |
| 6,108,533 A | 8/2000 | Brohoff |
| 6,113,494 A | 9/2000 | Lennert |
| 6,115,611 A | 9/2000 | Kimoto et al. |
| 6,122,520 A | 9/2000 | Want et al. |
| 6,134,532 A | 10/2000 | Lazarus et al. |

(List continued on next page.)

FOREIGN PATENT DOCUMENTS

| | | |
|---|---|---|
| EP | 1066867 A2 | 1/2001 |
| EP | 1066868 A2 | 1/2001 |
| EP | 1086732 A1 | 3/2001 |
| EP | 1087323 A1 | 3/2001 |

* cited by examiner

*Primary Examiner*—Edward F. Urban
*Assistant Examiner*—Marceau Milord
(74) *Attorney, Agent, or Firm*—Reed Smith LLP

(57) ABSTRACT

A system and method for locating mobile telephone devices via the Web. The mobile telephone device obtains and provides its location to a Web server in GPS latitude and longitude format. The communication between the Web server and the mobile telephone device may be through a browser or through mobile originated short message service. The Web server records the location information along with the time of receipt. Over time, the Web server may record several locations for a single mobile telephone device so that the progress of the mobile unit may be mapped. The information contained in the Web server is accessible to devices with Web browsing capabilities. A Web browsing device queries the Web server for location information pertaining to a particular mobile telephone device. The Web server may require authorization for such information before sending the location to the requesting device. The location information may be sent in a text only format or as text with graphics, depending on the display capabilities of the requesting Web browsing device.

13 Claims, 5 Drawing Sheets

U.S. PATENT DOCUMENTS

| | | | |
|---|---|---|---|
| 6,147,598 A * | 11/2000 | Murphy et al. ............. | 340/426 |
| 6,157,841 A | 12/2000 | Bolduc et al. | |
| 6,181,927 B1 | 1/2001 | Welling, Jr. et al. | |
| 6,199,045 B1 * | 3/2001 | Giniker et al. ................. | 705/1 |
| 6,202,023 B1 * | 3/2001 | Hancock et al. ............ | 701/201 |
| 6,208,866 B1 | 3/2001 | Rouhollahzadeh et al. | |
| 6,215,790 B1 * | 4/2001 | Voit et al. ................... | 370/401 |
| 6,216,129 B1 | 4/2001 | Eldering | |
| 6,223,291 B1 | 4/2001 | Puhl et al. | |
| 6,243,039 B1 * | 6/2001 | Elliot ......................... | 342/457 |
| 6,321,091 B1 * | 11/2001 | Holland ...................... | 455/456 |
| 2001/0005839 A1 | 6/2001 | Maenpaa et al. | |
| 2001/0011248 A1 | 8/2001 | Himmel et al. | |
| 2001/0013037 A1 | 8/2001 | Matsumoto | |
| 2001/0014911 A1 | 8/2001 | Doi et al. | |

\* cited by examiner

SYSTEM AND METHOD FOR LOCATING AND TRACKING MOBILE TELEPHONE DEVICES VIA THE INTERNET

FIELD OF THE INVENTION

The present invention relates generally to mobile wireless communications and, more particularly, relates to a system and method for locating and tracking mobile telephone devices via the Internet.

BACKGROUND OF THE INVENTION

The advent of wireless personal communications devices has revolutionized the telecommunications industry. Cellular, personal communications services ("PCS") and other services provide wireless personal communications to businesses and individuals at home, in the office, on the road, and to any other location the wireless network can reach. Wireless telephone subscribers no longer must use public telephones along the road or wait until returning to the home or office to check messages or to return important business calls. Instead, wireless subscribers can carry out day-to-day business from the privacy of an automobile, from a remote job site, while walking along the airport concourse, and anywhere else that a personal communications signal is accessible.

Thus, it is no surprise that since the introduction of the cellular telephone service, the number of wireless telephone subscribers has increased steadily. Today, there are a staggering number of wireless telephone subscribers whose ranks are growing rapidly. In fact, many households have multiple wireless telephones in addition to their conventional land line services.

With a market of this size, there is fierce competition among hardware manufacturers and service providers. In an attempt to lure customers, most providers offer handsets with desirable features or attributes such as small size, light weight, longer battery life, speed dial, and the like. Many recent additions to the marketplace include multi-functional handsets that even provide pocket organizer functions integrated into the wireless handset. Most manufacturers, however, are still scrambling to add new features to their communications devices to snare a portion of this booming market.

One way in which new features are added to wireless communication devices is by integrating the devices into the Web. Such integration allows the countless services available through the Web to be extended to wireless communications devices. Moreover, some mobile telephones have the ability to determine their own location, such as through use of GPS. The present invention takes advantage of this intriguing combination of location self-determination and connectivity to the Web.

SUMMARY OF THE INVENTION

The present invention is directed toward a system and method for locating and tracking mobile telephone devices via the Internet. In general, a mobile telephone device publishes its location to a server computer that is connected to the World Wide Web ("Web"). Subsequently, the information about the location of the mobile telephone device is available from the Web server. In this fashion, the location of a mobile telephone device can be obtained through the Internet.

More specifically, the mobile telephone device can publish its location either manually or automatically. In the manual publication process, the user takes a specific action to cause the mobile telephone device to publish its location. Once the user has manually instructed the mobile telephone device to publish its location, the device acquires its GPS location, establishes a communications link with the Web server and provides its location to the Web server.

Alternatively, the user's action could instruct the mobile telephone device to automatically publish its location. In this embodiment, once the user has instructed the mobile telephone device to automatically publish its location, the mobile telephone device periodically acquires its GPS location and then establishes a communications link with the Web server and provides its location to the server. This periodic communication continues until the mobile telephone device is instructed to discontinue automatic publishing of its location.

In another embodiment of the automatic publishing process, the Web server periodically queries the mobile telephone device. To do so, the Web server sends a message to the mobile telephone device requesting the device's location. When the mobile telephone device receives the request, it responds by acquiring its GPS location and then sending the location to the server.

These and other aspects and embodiments of the present invention will be apparent in the following description, claims and drawings.

BRIEF DESCRIPTION OF THE DRAWINGS

The details of the present invention, both as to its structure and operation, can best be understood in reference to the accompanying drawings, in which like reference numerals refer to like parts, and in which.

DETAILED DESCRIPTION OF THE INVENTION

1. Example Environment

Figure 1:
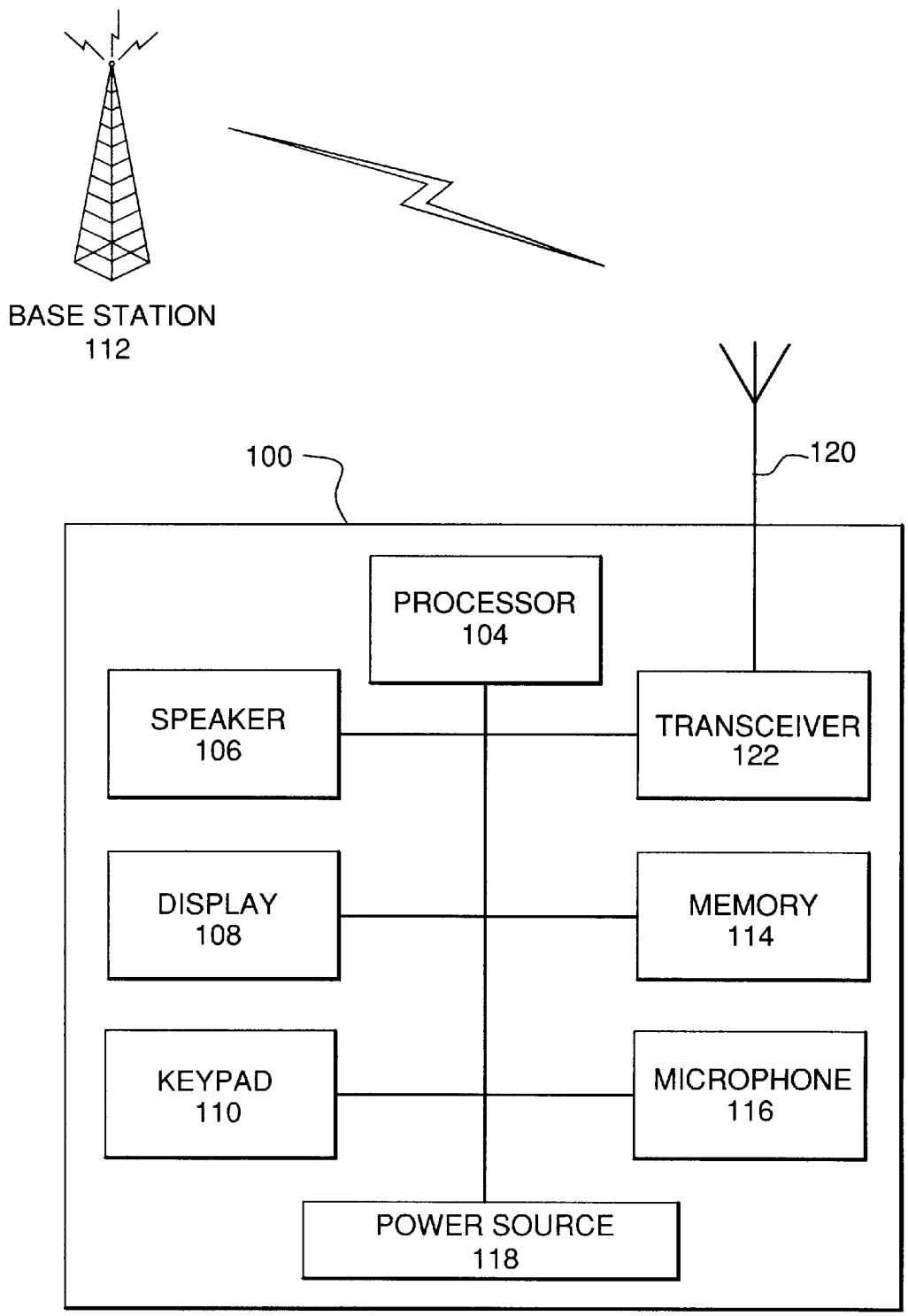
FIG. 1 is a block diagram of a wireless communication device.

Before describing the invention in detail, an example environment in which the invention can be implemented will be described. One example environment is a handset or communication device operating within a wireless communication network such as, for example, a cellular, GSM, PCS or radio communication network. One example wireless communication device (handset) 100 is illustrated in FIG. 1.

Wireless communication devices embodying the present invention, however, can be implemented in various configurations and architectures. Implementation of the invention is not dependent on any particular device architecture or communication network. In the following description, the descriptors "wireless communication device", "wireless handset", "mobile telephone device", and the like all refer to a communication device operating within a wireless network.

Handset 100 includes processor 104, speaker 106, display 108, keypad 110, transceiver 122, memory 114, microphone 116, power source 118 and antenna 120. Handset 100 is typically a mobile unit such as a handheld cellular phone or an integrated vehicle phone. It is configured to communicate with other communications devices such as base station 112. Base station 112 is located within a geographic area known as a "cell" and handles communications for all mobile units within the cell.

Processor 104 directs the overall operation of handset 100. A computer program or set of instructions is typically coded or otherwise implemented on the processor to enable the processor to carry out the device operation. As will be described in more detail below, an Internet or World Wide Web ("Web") browser may be coded into the processor and used as the operating system for handset 100. Memory 114 interfaces with processor 104 and may store program code and provide storage space for data useful in executing the program code and carrying out handset functions. Memory 114 may be implemented as Read Only Memory ("ROM"), Random Access Memory ("RAM") or as any other convenient memory format. The features and functionality of the invention described below may be implemented using hardware, software or a combination of hardware and software. If implemented as software, the software may run on processor 104 or be stored in memory 114.

Transceiver 122 includes a transmitter that transmits voice and data information via antenna 120 to a recipient communication device (such as base station 112), and a receiver that receives voice and data information from a transmitting communication device (such as base station 112). User interface features include speaker 106, display 108, keypad 110 and microphone 116. Microphone 116 accepts voice or other audio information from the user and converts this information into electrical signals that can be transmitted by transceiver 122. Likewise, speaker 106 converts electrical signals received by transceiver 122 into audio information that can be heard by a user of device 100. Display 108 displays information such as call information, keypad entry information, signal presence and strength information, battery life information, and other useful information. Display 108 preferably takes the form of a liquid crystal display ("LCD"), which has low power consumption characteristics, but could also be implemented as a light emitting diode ("LED") display or any other appropriate visual indicator. Keypad 110 typically includes an alphanumeric keypad and special function keys. It may be backlit to permit viewing of the keys in low light or dark conditions. A flip panel (not shown) may conceal all or a portion of keypad 110.

Power source 118 provides power to device 100. It may be implemented with rechargeable batteries, such as NiCad or NiMH rechargeable batteries, or with any other suitable power source.

2. Wireless Services Through a Web Server

Figure 2:
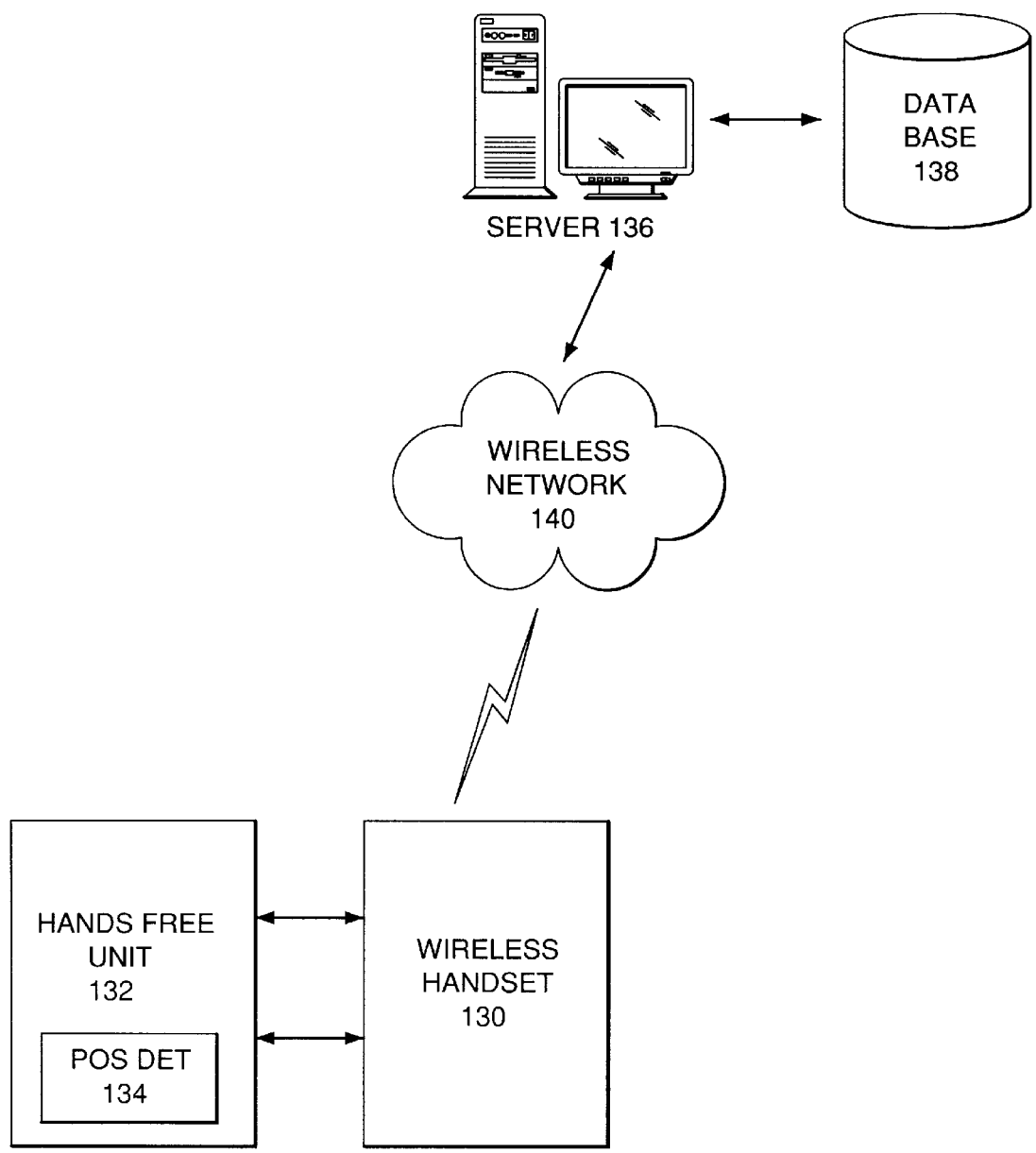
FIG. 2 is a block diagram of a wireless communication system according to the present invention.

FIG. 2 is a block diagram illustrating a wireless communication system according to the present invention. The communication system provides information to a wireless handset based on the location of the device. It includes a wireless handset 130 and a hands-free unit 132 incorporating a position determination system 134. Handset 130 can be implemented in a configuration similar to that of handset 100 of FIG. 1, or in any other device configuration that is capable of communicating with remote locations via a wireless communication medium. In the description below, "handset" refers to any communication device capable of communicating with other devices via a wireless medium.

Hands-free unit 132 is optionally provided to allow the user of handset 130 to communicate in a hands-free mode. Hands-free unit 132 may include a microphone and speaker to provide handset 130 with speakerphone-like capabilities. Such capabilities are particularly desirable where handset 130 is utilized in an automobile or other mobile situation. In one implementation, hands-free unit 132 is configured according to conventional industry standards for a "hands-free kit".

As mentioned above, hands-free unit 132 is preferably equipped with a position determination system 134 that determines the location of hands-free unit 132 and handset 130. Position determination system 134 could also be directly incorporated into handset 130. System 134 determines location in terms of parameters such as latitude, longitude, height, speed of travel, and other useful location or position parameters. In one implementation, position determination system 134 uses the Global Positioning System ("GPS") or differential GPS, the operation of which is well known to those of ordinary skill in the art. Alternative position determination systems, such as triangulation systems, may also be used.

Handset 130 preferably includes both a voice and data interface, particularly where position determination system 134 is incorporated in hands-free unit 132. The voice interface provides hands-free operation and speakerphone-like capabilities. The data interface allows location information obtained by system 134 to be provided to handset 130 for transmission over wireless network 140.

Handset 130 communicates with other entities via wireless network 140. Network 140 is typically comprised of a plurality of base stations that provide relay points for communication. Network 140 may be a cellular, PCS, GSM, or any other wireless communication network. In addition to conventional communication with other wired or wireless communication devices, as shown in FIG. 2, network 140 permits communication between handset 130 and data server(s) 136. When a user requests information, handset 130 provides the location of the handset to server 136 across wireless network 140. Server 136 retrieves relevant information from an associated database 138 and conveys the information to handset 130 over wireless network 140. The information may be displayed on the handset display or audibly rendered via speech synthesis or prerecorded scripts. Although the type of information stored in database 138 is virtually limitless, several example applications are provided for illustrative purposes.

In one example application, driving directions to a destination address are provided to handset 130. The handset user requests driving directions to the destination, and the handset relays the request to server 136 over wireless network 140. At the time of the request, the handset location is also provided to server 136 to provide a starting point for the directions. Using the handset location and the destination address, server 136 calculates a route and compiles driving directions. The driving directions are transmitted to handset 130 over network 140 and are displayed or audibly rendered to the user. In addition to textual driving directions, a map showing the route may be displayed on the handset display. Options such as the shortest possible route, interstate route, safest route, most scenic route, etc. may be provided. The user's choice of options will dictate the route calculation. The options may be stored locally and prompts or scripts generated in the memory of handset 130. Alternatively, the options, prompts and scripts may be stored at server 136 and provided to the user via network 140.

Another example application locates particular types of businesses or services in the user's location. Restaurants, gas stations, hotels and other businesses or services near the user's location can be identified and provided to the user. Again, the user requests the business or service type vocally or via keypad entry. The request is communicated to server 136 over wireless network 140, along with the user's current location as determined by the position determination system 134. Server 136, based on the handset location and user request, retrieves and returns relevant information to handset 130 over network 140.

Parameter limits or filters may be implemented to refine the request and selections returned. The user may set a location filter, for example, that requires returned selections be within a certain maximum number of miles of the user's current location. If the user is seeking a restaurant, the user may request or be prompted to select parameters that refine the search results. These parameters may include cuisine type (e.g., Italian, French, American, etc.), restaurant type (e.g., fast food, casual dining, formal, etc.), price range and so on. Additionally, for restaurants, gas stations, motels and other businesses, the user may identify a preferred national or regional chain. Alternatively, the user may have a preferences profile stored in the Web server 136 that contains this information.

As noted above, the search may be refined (the query narrowed) on the user's own initiative or based on system prompts. If the user simply requests a nearby restaurant, for example, server 136 may prompt the user with questions about parameters such as those described above. Alternatively, to conserve bandwidth over network 140, prompts can be stored locally and made by handset 130 (or hands-free unit 132) before the request is sent to server 136. In this embodiment, updated scripts and/or prompts may be downloaded from server 136 to handset 130. Preferably, memory-intensive data such as establishment locations, driving directions, etc. are stored in database 138 to minimize the amount of memory required in handset 130. The precise distribution of data storage among these devices will be influenced by factors such as available bandwidth, memory costs and airtime costs.

Figure 3:
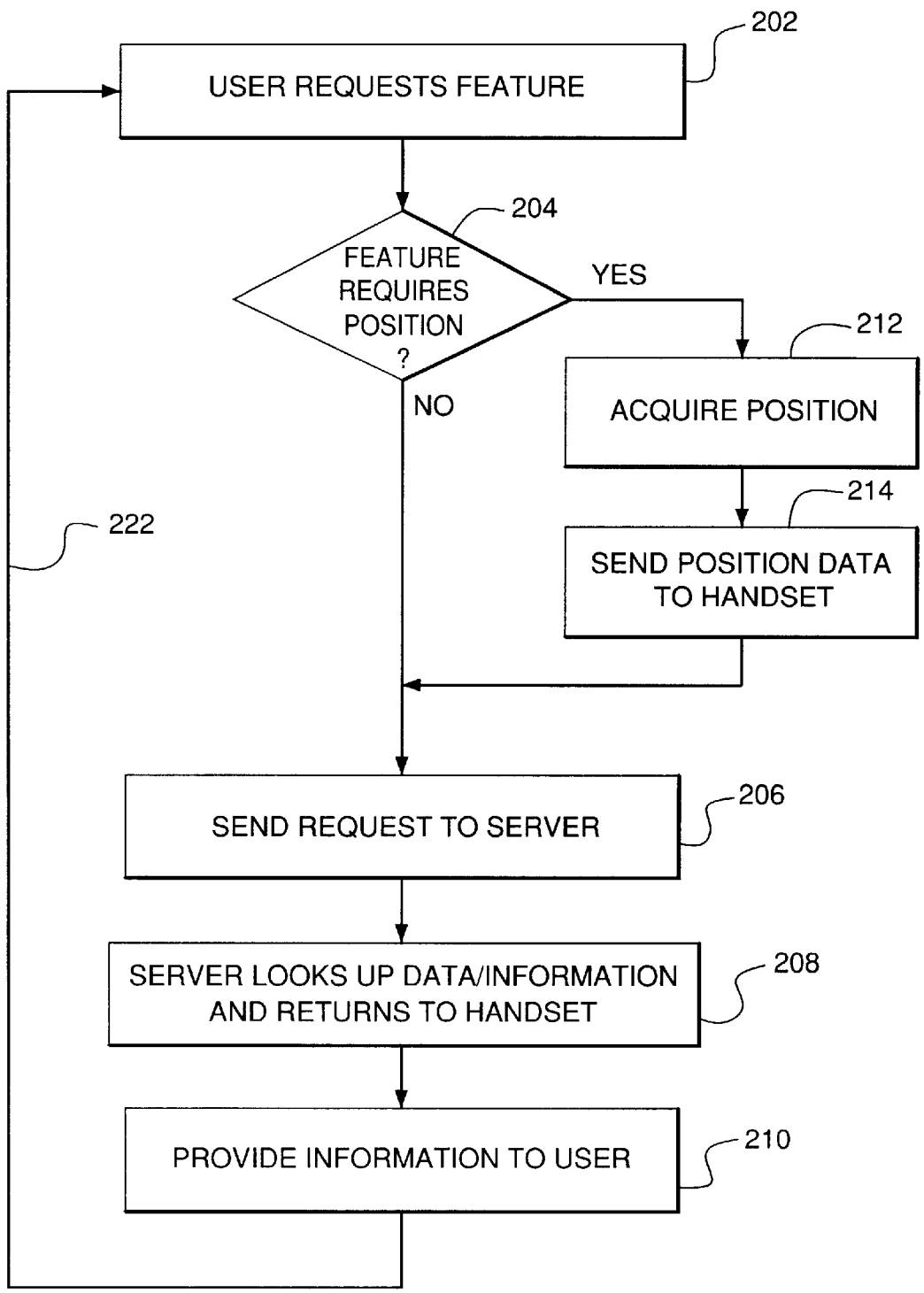
FIG. 3 is a flowchart of a method for requesting information across a wireless network according to the present invention.

A method for requesting information across network 140 is illustrated in FIG. 3. In step 202, a user initiates a request for information. In step 204, the system determines whether the request requires the handset location or position. If position information is required, the method proceeds from step 204 to step 212, where system 134 acquires the position of handset 130. If system 134 is situated in hands-free unit 132, unit 132 provides the position data to handset 130 for transmission to server 136 over wireless network 140 (step 214). If position information is not required, the method proceeds from step 204 directly to step 206.

In step 206, handset 130 sends the request to server 136 via wireless network 140. The request includes any position data acquired in steps 212–214. In step 208, server 136 retrieves the data or information requested from database 138 and communicates the data to handset 130 over network 140. In step 210, the data is displayed or provided to the user.

As described above, scripts or prompts may be provided to the user to refine the information request. If the scripts or prompts are stored in database 138 (as opposed to local storage in handset 130), they are retrieved by server 136 in step 208 and provided to the user in step 210. The user's answers to the prompts are sent by handset 130 to server 136, which uses the refined information to retrieve additional data or information from database 138, or to further refine the user's query. This potentially repetitive process is illustrated in FIG. 3 by flow line 222 and the repetition of steps 202, 206 and 208.

3. Locating Wireless Mobile Phones via the Internet

Figure 4:
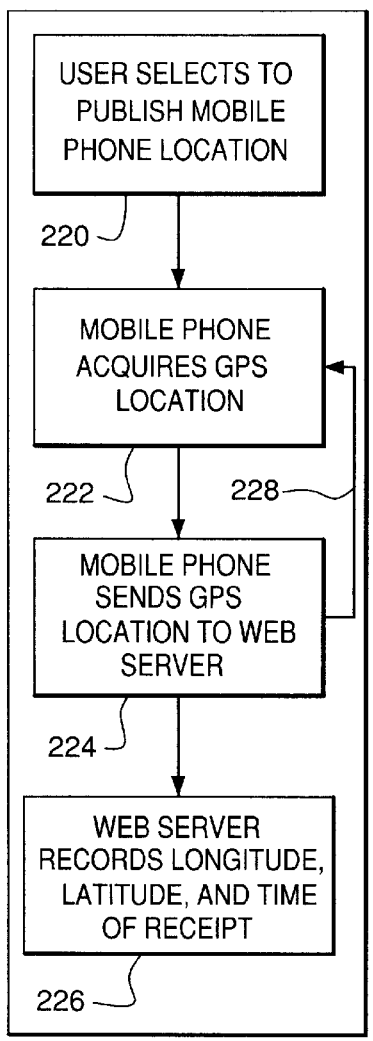
FIG. 4 is a flowchart of a method for supplying a Web server with the location of a mobile telephone device according to the present invention.

FIG. 4 depicts a process for supplying a Web server with location information from a mobile telephone device. A user of the mobile telephone initiates this process by making an appropriate selection to publish the mobile phone location (step 220). In one embodiment, a browser residing on the phone is used to make this selection. The browser may be part of a user interface that allows a user to navigate through the functionality of the device. In this example, the user navigates to the option for publishing the mobile telephone device location and selects that service.

After the user initiates the location publishing service, the mobile telephone acquires its location information (step 222). In one embodiment, the mobile telephone is equipped with a GPS location module that obtains the GPS location of the mobile telephone. This information is passed from the GPS module to the mobile telephone browser. The mobile telephone then sends the GPS information to the Web server (step 224).

Upon receipt of the location information from the mobile telephone, the Web server records the GPS information (latitude and longitude) and the time of receipt (step 226). This information is stored by the Web server along with any previous sets of GPS information pertaining to that mobile telephone. If the user sends location information every ten minutes for one hour, for example, the Web server would have six sets of longitude, latitude, and time of receipt for that specific mobile telephone. This information may subsequently be used to map the traveling progress of the mobile telephone.

As shown by recursive line 228, the mobile telephone can be configured to automatically and continuously send its location information to the Web server. The time interval between transmissions from the mobile telephone is preferably configurable by the user. In this embodiment, the user navigates through the browser on the mobile unit and selects an option for automatically publishing location information. In addition, the user selects the desired time interval. Similar to the manual publishing process, the mobile telephone acquires its location information and sends that information to the Web server. After the user-specified period elapses, the mobile unit re-acquires its location information and sends that information to the Web server. The Web server receives and records the information (longitude and latitude) along with the time that it was received.

Figure 5:
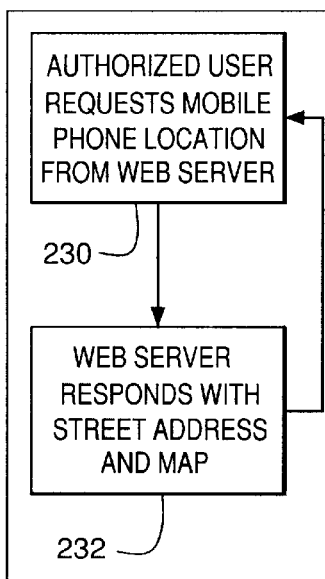
FIG. 5 is a flowchart of a method for supplying the location of a mobile telephone device to an authorized user of a Web browser according to the present invention.

Information provided to and stored by the server in the manner described above may also be provided to authorized users who want to know the location of a particular mobile telephone (FIG. 5). An authorized user requests the location of a mobile telephone from the Web server (step 230).

In one embodiment, after connecting to the Web server using a Web browser utility application, the Web server displays an authorization screen that requires the requesting party to enter a valid user name and password combination. The Web server validates the entered name and password by comparing them to records of authorized users in a database maintained on the server. If validation succeeds, the server releases the location information to the requesting party.

This example, of course, is merely one description of a process to validate use of computer related services. Alternative validation methods will be known to those of ordinary skill in the art.

Figure 7:
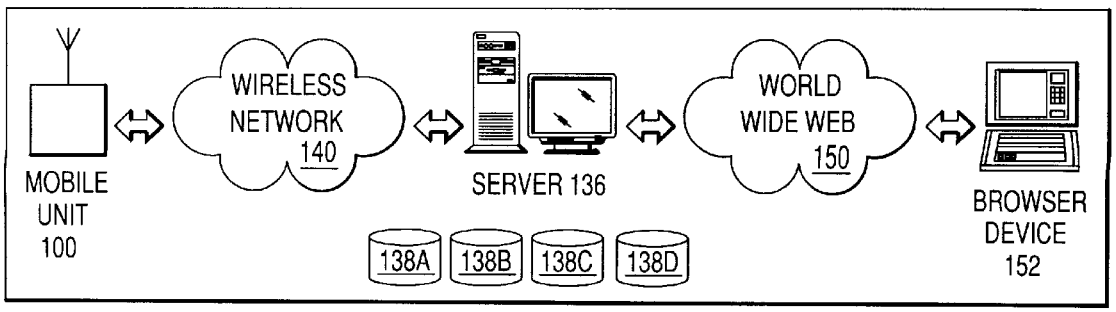
FIG. 7 is a block diagram of a wireless communication system that connects wireless communications devices and other browser capable devices to the Web, according to the present invention.

In one embodiment, a requesting party gains access to a Web server 136 via a browser residing on a mobile telephone device 100 (FIG. 7). Using the browser, the requesting party navigates to and selects an option for retrieving location information. Device 100 then connects to a server 136 connected to Web 150 via wireless network 140. The requesting party enters the required authorization information and a unique identifier of the specific mobile telephone device whose location is desired. In one embodiment, the unique identifier is the telephone number for that device. The Web server 136 responds with the street address of the mobile telephone and the time that the mobile unit reported being at that location (step 232). Alternatively, and depending on the display capabilities of the mobile telephone, Web server 136 may respond with the street address, time, and a map with the mobile telephone's location noted on the map.

In another embodiment, the requesting user connects to server 136 by using a browser device 152 that is connected to Web 150 via direct connect, modem, cellular modem, cable modem, or any other connection device known in the art. Browser capable devices include, but are not limited to, cellular devices, personal computers, screen telephones, television sets, electronic gaming devices, and any other devices with the capability to connect to the Web with a browsing utility.

The map provided by Web server 136 can be supplied by a third party service, accessible via the Web 150. One well-known online supplier of maps and directions, for example, is MapQuest, Inc., located on the Web at www-.mapquest.com. Therefore, in this example, MapQuest would supply the map to the Web server 136. The Web server 136 marks the location of the mobile telephone device on the map. Upon receiving the request, the Web server 136 delivers the marked map to the requesting party. In a preferred embodiment, the map is marked with several locations of the mobile unit, representing the mobile unit's progress over time.

Figure 6:
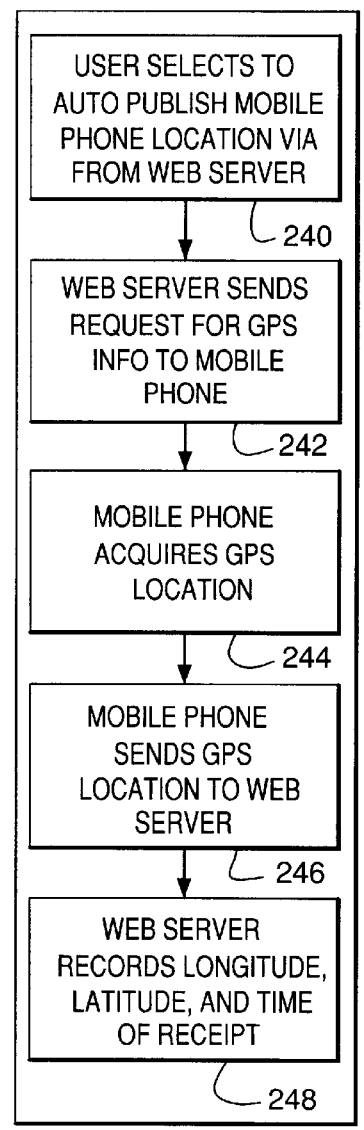
FIG. 6 is a flowchart of a method for a Web server to automatically determine the location of a mobile telephone device according to the present invention.

FIG. 6 is a flowchart of a process for automatically sending location information from a mobile telephone device to a Web server. In step 240, the user of the mobile telephone device navigates through the mobile unit's browser and selects an option for automatically publishing its location. In one implementation, the user may choose to have Web server 136 periodically query the mobile unit for updated location information. Alternatively, the user may choose to have the mobile unit 100 periodically send its location to Web server 136, as previously described above with reference to step 228. In step 242, Web server 136 sends a request for GPS information to the mobile telephone device. The mobile unit then acquires its GPS location (step 244) using any of several methods that are well known in the art. After acquiring its GPS location information, in step 246, the mobile telephone device sends the GPS information to Web server 136. When server 136 receives the location information, it records the longitude, latitude, and the time of receipt (step 248).

FIG. 7 illustrates a wireless communication system that connects wireless communications devices and other browser capable devices to the Web. Mobile unit 100 is shown, as in FIG. 2, connected to the Web 150 via wireless communications network 140. Also connected to the Web is browser device 152. Browser device 152 may be a personal computer, personal communication device, pager, television, screen phone, personal digital assistant, or any other device with the capability to connect to Web 150 using a browser-based utility. The connection between browser device 152 and Web 150 may be any suitable connection including, but not limited to, direct connections, wireless network connections, cellular modem connections, standard modem connections, cable modem connections, digital or analog connections, and satellite connections.

Figure 8:
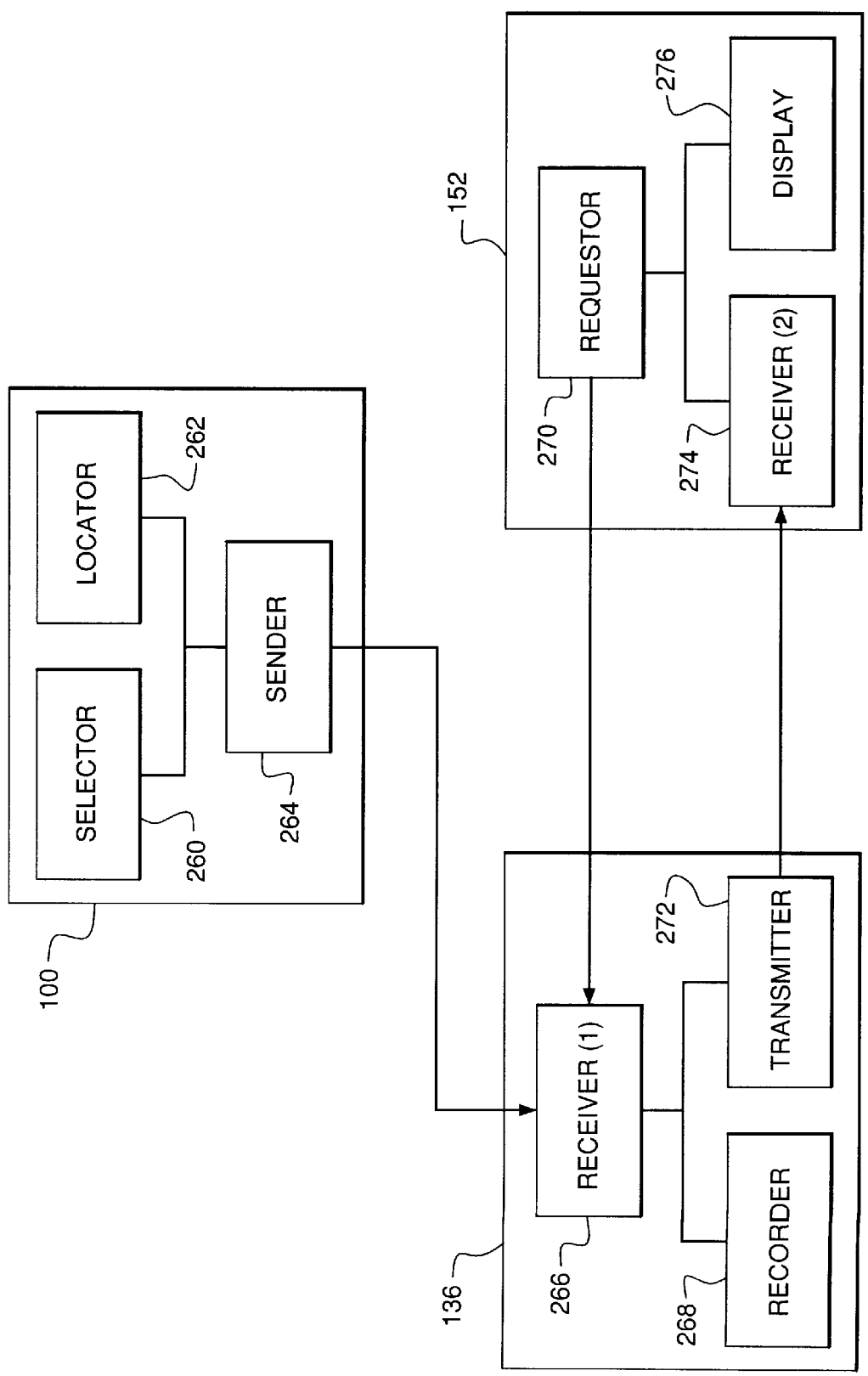
FIG. 8 is a block diagram of a wireless communication system according to the present invention.

FIG. 8 depicts a wireless communications system according to the present invention, including a mobile telephone device 100, Web server 136 and browser device 152. Mobile telephone device 100 first sends its GPS location to Web server 136. To do so, mobile telephone device 100 employs a selector 260, a locator 262 and a sender 264. First, selector 260 allows the user to choose to send GPS information to Web server 136. After this selection is made, locator 262 obtains the GPS location of the mobile telephone 100. Next, sender 264 sends that information to Web server 136. This communication preferably takes place over a wireless network 140.

Web server 136 has a first receiver 266 that receives the GPS location information from mobile unit 100. Recorder 268 stores the latitude and longitude information received from mobile unit 100, as well as the time that the GPS information was received.

Browser device 152 may be connected to Web server 136 through a standard network connection, through the global Internet, or through the Web. Alternatively, it may be connected to Web server 136 through wireless communications network 140. Browser device 152 uses requester 270 to send a query to first receiver 266 of Web server 136 requesting GPS information for a specific mobile telephone device 100. Web server 136 responds to this request with the requested information using transmitter 272. Browser device 152 accepts the transmission from server 136 with second receiver 274. After second receiver 274 receives the entire transmission, displayer 276 presents the GPS information on the display of browser device 152. The GPS information may be sent in text format only or in text format with graphics. Preferably, browser device 152 can display fill color graphics and will present a graphical map on the browser display.

While several embodiments of the present invention have been shown and described in detail, the description and drawings are merely representative of the subject matter broadly contemplated by the present invention. It is further to be understood that the scope of the present invention fully encompasses other embodiments that may become obvious to those skilled in the art, and that the scope of the present invention is defined only b the appended claims.

What is claimed is:

1. A method of locating a mobile telephone device via the Web, comprising:

at the mobile telephone device, selecting to publish the location of the mobile device, acquiring the GPS location of the mobile device, and sending the GPS location to a Web server;

at the Web server, recording the GPS location and the time the GPS location was received, receiving a request for the GPS location of the mobile device from a Web browsing device, and sending the GPS location to the browsing device; and at the browsing device, requesting the location of the mobile device from the Web server, receiving the mobile device location, and displaying the mobile device location.

2. A method as claimed in claim 1 and further comprising:
at the Web server, authorizing the browsing device before sending the GPS location of the mobile device to the browsing device.

3. A method as claimed in claim 1 wherein the browsing device is a wireless communications device.

4. A method as claimed in claim 3 wherein the browsing device is a digital cellular telephone.

5. A method as claimed in claim 1 wherein the acquiring and sending steps performed by the mobile device are automatically repeated after predetermined time intervals.

6. A method as claimed in claim 5 wherein the selecting step comprises selecting the predetermined time interval.

7. The method claim 1, wherein said selecting comprises using a user interface.

8. The method of claim 7, wherein said user interface comprises a browser.

9. A method of locating a mobile telephone device connected to a Web server via a wireless communications network, comprising:
at the mobile telephone device, receiving a query from the Web server requesting the location of the mobile unit device, obtaining the latitude and longitude of the mobile device, and transmitting the latitude and longitude to the Web server;
at the Web server, sending the query to the mobile device, receiving the latitude and longitude of the mobile device in response to the query, recording the latitude and longitude and the time that it was received, receiving a request from a Web browsing device for the latitude and longitude of the mobile device, and sending the latitude and longitude to the browsing device; and
at the Web browsing device, requesting the latitude and longitude of the mobile device from the Web server, receiving the latitude and longitude, and displaying the latitude and longitude.

10. A method as claimed in claim 7 wherein the Web server automatically sends queries to the mobile device after predetermined time intervals.

11. A method as claimed in claim 7 wherein the Web server requires authentication from the browsing device prior to sending the latitude and longitude of the mobile device.

12. A tracking system comprising a mobile telephone device connected to a Web server by a wireless network, and a browser capable device connected to the Web server through a network wherein:
the mobile telephone device comprises a selector for selecting to send location information to the Web server, a locator for acquiring the GPS location of the mobile device, and a sender for sending the GPS location to the Web server;
the Web server comprises a receiver for receiving the GPS location of the mobile device and for receiving a query for the GPS location from the browser capable device, a recorder for recording the GPS location and time of receipt, and a transmitter for transmitting the GPS location to the browser capable device in response to the query for the GPS location; and
the browser capable device comprises a requestor for requesting the GPS location of the mobile device from the Web server, and a displayer for displaying the GPS location of the mobile device transmitted by the Web server.

13. A system as claimed in claim 10 locator and sender acquire and send the GPS location of the mobile device automatically and repeatedly after predetermined time intervals.

* * * * *